United States Patent [19]

Polak

[11] Patent Number: 4,679,454

[45] Date of Patent: Jul. 14, 1987

[54] MULTI-RATIO TRANSMISSION

[75] Inventor: James C. Polak, Indianapolis, Ind.

[73] Assignee: General Motors Corporation, Detroit, Mich.

[21] Appl. No.: 808,645

[22] Filed: Dec. 13, 1985

[51] Int. Cl.⁴ .............................................. F16H 3/08
[52] U.S. Cl. ...................................... 74/330; 74/334; 74/356; 74/359
[58] Field of Search ................. 74/359, 325, 331, 334, 74/360, 356, 333, 330

[56] References Cited

U.S. PATENT DOCUMENTS

| | | | |
|---|---|---|---|
| 4,159,654 | 7/1979 | Hattori | 74/331 |
| 4,461,188 | 7/1984 | Fisher | 74/331 X |
| 4,463,621 | 8/1984 | Fisher | 74/331 X |
| 4,488,446 | 12/1984 | Nishikawa et al. | 74/333 X |
| 4,513,631 | 4/1985 | Koivunen | 74/331 X |

FOREIGN PATENT DOCUMENTS

| | | | |
|---|---|---|---|
| 2035867 | 1/1972 | Fed. Rep. of Germany | 74/331 |
| 2086497 | 5/1982 | United Kingdom | 74/359 |
| 2095775 | 10/1982 | United Kingdom | 74/359 |

Primary Examiner—Rodney H. Bonck
Assistant Examiner—David A. Testardi
Attorney, Agent, or Firm—Donald F. Scherer

[57] ABSTRACT

A preselected transmission has three friction clutches and one synchronized mechanical clutch assembly to provide five forward speed ratios. An additional mechanical clutch permits the addition of a reverse ratio. The clutches are combined with a gearing arrangement such that sequential or skip-shifting can be accomplished.

3 Claims, 2 Drawing Figures

MULTI-RATIO TRANSMISSION

BACKGROUND OF THE INVENTION

This invention relates to preselected shifting transmissions and more particularly to such transmissions that permit both sequential and skip-shifting patterns.

Prior art sequential and skip-shifting transmissions are disclosed in U.S. Pat. No. 4,513,631, issued to Koivunen on Apr. 30, 1985, and U.S. patent application Ser. No. 705,206, filed Feb. 25, 1985 now U.S. Pat. No. 4,610,177. Both of these documents are assigned to the assignee of this application.

SUMMARY OF THE INVENTION

The present invention permits ratio skip-shifting without the use of duplicate ratio gearing. The present invention uses only one mechanically synchronized clutch assembly for the forward gear ratios. Also the number of forward gear ratios can be increased in pairs by the addition of a single friction clutch and the appropriate ratio gear elements. The number of mechanically synchronized clutches remains at one even with the addition of two forward ratios.

It is therefore an object of this invention to provide an improved preselected multi-ratio transmission having three selectively engageable friction clutches, one mechanically synchronized clutch assembly and four pairs of ratio gears which are selectively operable in combination to provide five forward gear ratios.

It is another object of this invention to provide an improved preselected multi-ratio transmission having three selectively engageable friction clutches, two mechanically synchronized clutch assemblies, four pairs of ratio gears and a reverse idler gear which are selectively operable in combination to provide five forward gear ratios and one reverse ratio.

It is a further object of this invention to provide an improved preselected ratio transmission having a plurality of selectively engageable friction clutches, one mechanically synchronized clutch assembly and a plurality of pairs of ratio gears sufficient to provide forward ratios equal in number to one less than twice the friction clutches, wherein the components are selectively operable in combination to provide an odd number of forward gear ratios in a manner which permits shifting to and across the centermost forward ratio.

DESCRIPTION OF THE PREFERRED EMBODIMENT

Figure 1:
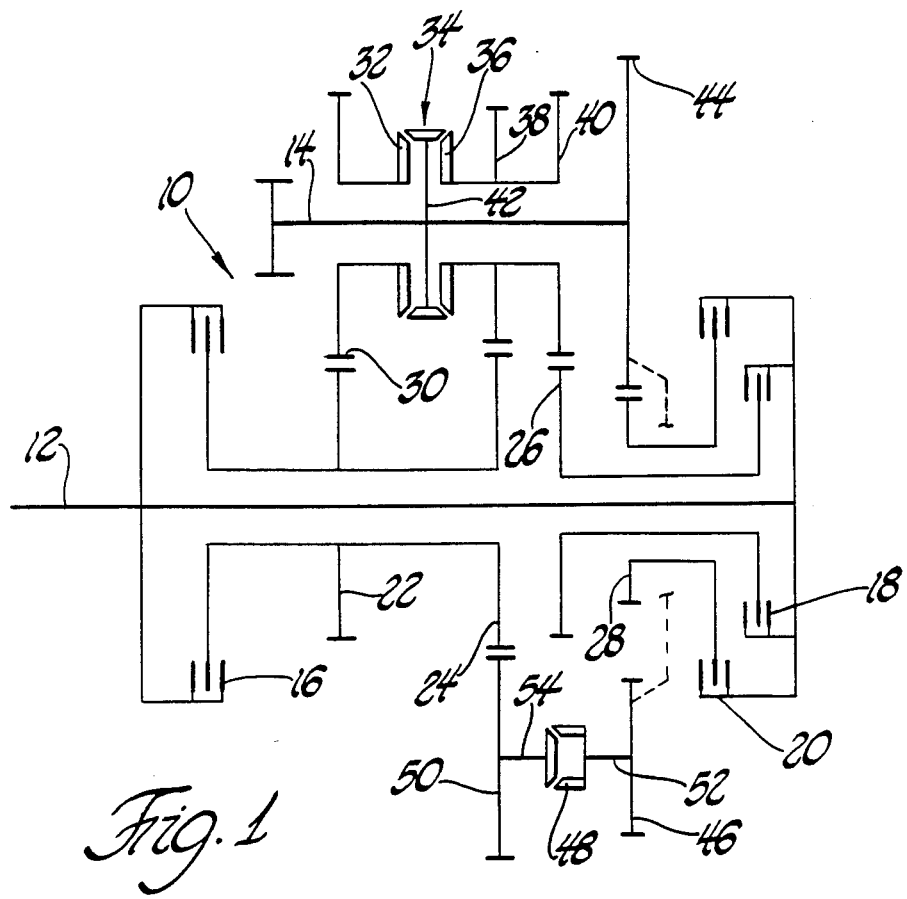
FIG. 1 is a schematic representation of a gearing arrangement incorporating the present invention.
Figure 2:
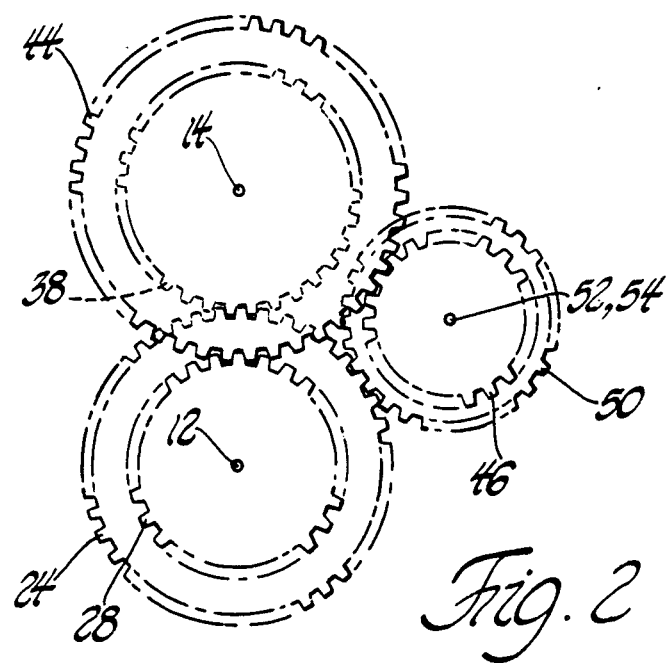
FIG. 2 is a diagrammatic representation of an end view of a portion of the gearing.

Referring to the drawings, wherein like characters represent the same or corresponding parts throughout the views, there is seen in FIG. 1 a transmission, generally designated 10, having an input shaft 12 and an output shaft 14. The input shaft 12 has operatively connected therewith three rotating clutches 16, 18 and 20. The clutch 16 has drivingly connected therewith a pair of gear members 22 and 24. The clutch 18 has connected therewith a gear member 26, and the clutch 20 has drivingly connected therewith a gear 28.

The gear 22 meshes with a gear 30 rotatably disposed on the output shaft 14 and drivingly connected with one portion 32 of a mechanical double-acting synchronizer clutch 34. Another portion 36 of the synchronizer clutch 34 is connected to a pair of gears 38 and 40 meshing respectively with the gears 24 and 26.

The output member 42 of the synchronizer clutch 34 is drivingly connected with the output shaft 14 and with a gear member 44 which meshes with gear member 28 and a reverse idler gear 46. The reverse idler gear 46 is operatively connected through a single-sided mechanical synchronized clutch 48 with another reverse idler gear 50 which meshes with gear 24. The reverse idler gears 46 and 50 are connected with respective idler shafts 52 and 54.

The friction clutches 16, 18 and 20 may be constructed in accordance with any of the well-known selectively engageable friction type clutches which may be engaged hydraulically, electrically or mechanically. The synchronizer clutches 34 and 48 can be constructed in accordance with the known synchronizer type clutches and may be manipulated either mechanically, electrically or hydraulically. Controls for such devices are well known.

The friction clutches 16, 18 and 20 and the synchronizer clutch 34 can be selectively engaged in combination to provide five forward driving speeds as follows.

The synchronizer clutch 34 is manipulated to provide a drive relationship between portion 32 and output shaft 14 thereby connecting gear 30 to the output shaft 14. Selective engagement of clutch 16 will transmit driving torque from the input shaft 12 through gears 22 and 30 to the output shaft 14. This provides the first and lowest drive ratio of the transmission.

For second ratio operation, the friction clutches 16 and 18 are interchanged using any of the well-known clutch control mechanisms such that drive torque from the input shaft 12 will be transmitted through gears 26 and 40, gears 38 and 24, and gears 22 and 30 to the output shaft 14.

The third and centermost drive ratio is accomplished by interchanging clutches 18 and 20 such that the input torque at shaft 12 is delivered through gears 28 and 44 to the output shaft 14. During third gear operation, the synchronizer clutch 34 is torque unloaded such that free manipulation thereof is possible. During third gear operation, the synchronizer clutch 34 provides disengagement between portion 32 and output shaft 14 and is moved into engagement to provide driving connection between portion 36 and the output shaft 14.

After manipulation of the synchronizer clutch 34, the fourth ratio drive is established by simultaneously interchanging clutches 16 and 20. With clutch 16 engaged, input torque is delivered through gears 24 and 38 to the output shaft 14. The fifth and highest gear ratio is provided by interchanging clutches 16 and 18. With clutch 18 engaged, the input torque on input shaft 12 will be directed through gears 26 and 40 to the output shaft 14.

Reverse gear is engaged with the vehicle stationary and the synchronizer clutch 34 in neutral by engaging the synchronizer clutch 48 and thereafter controllably engaging clutch 16 such that forwardly directed input torque on the shaft 12 is connected through gears 24 and 50, and gears 46 and 44 of the output shaft 14. The reverse idler gears 50 and 46 provide for a rotation reversal between the input shaft 12 and the output shaft 14.

From the above description, it will be appreciated that sequential shifting of the forward gear ratios, first through fifth, is easily accomplished. This is a conventional shifting pattern. However, with the present invention, it is also possible to provide skip-shifting from first gear to third gear to fifth gear in the following manner. Synchronizer clutch 34 is manipulated to engage portion 32 and thereafter the clutch 16 is engaged to provide first gear operation. Selective interchange of clutches 16 and 20 will permit a ratio change from first to third. During third gear operation, the synchronizer clutch 34 can be manipulated to engage the portion 36 after which the clutches 20 and 18 are interchanged to provide a ratio change from third to fifth. Downshifting from fifth to third to first can be accomplished by reversing the clutch interchanges.

In some instances, it may be desirable to provide additional forward speed ranges. Additional forward speed ranges can be provided in pairs through the addition of a single friction clutch and gear member and an additional gear member being made drivingly connected with the synchronizer portion 36. The additional gear ratios are provided by selective engagement of the added friction clutch and depending upon the condition of synchronizer clutch 34, the additional ratio will be either lower or higher than the centermost or central ratio provided by clutch 20 and the gears 28 and 44. The addition of a friction clutch will not inhibit the skip-shifting from a ratio below the central ratio to the central ratio and then skip-shifted above the central ratio. For example, in a 7-speed transmission, skip-shifting from first to fourth to sixth or seventh could be accomplished as could skip-shifting from second to fourth to sixth or seventh.

From the above description, it should be evident that the 5-speed ratio transmission described is a basic element in providing a preselected skip-shifting transmission. The addition of gear ratios to the transmission is readily accomplished such that the overall transmission ratios can be expanded from five to seven to nine, etc. The limiting factor of adding transmission ratios is, of course, a physical one and is determined by the volume required for the transmission to fit in the vehicle. It should therefore be recognized that a family of transmissions can be provided by expanding the basic 5-speed transmission described herein.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A preselected multi-ratio power transmission comprising; input means for transmitting drive forces; output means; first, second and third friction clutch means each selectively engageable with said input means for accepting drive forces therefrom, first input gear means drivingly connected with said first friction clutch means; second input gear means drivingly connected with said second friction clutch means; third input gear means drivingly connected with said third clutch means; first output gear means drivingly connected with said first input gear means; second output gear means drivingly connected with said first and second input gear means; third output means drivingly connected between said third input gear means and said output means; reverse gear means drivingly connected between said first input gear means and said third output gear means including a selectively engageable mechanical clutch means; and one double-acting synchronizer clutch for selectively engaging said first output gear means with said output means and alternately said second output gear means with said output means, said first friction clutch means and said one double-acting synchronizer clutch cooperating during engagement to establish two forward drive ratios between said input and output means, said second friction clutch means and said one double-acting synchronizer clutch cooperating during engagement to establish two other forward drive ratios between said input and output means, said third friction clutch means being engageable to provide another forward drive ratio between said input means and said output means which ratio is numerically central of the first mentioned two forward drive ratios and also of the second mentioned two forward drive ratios, and said first friction clutch means and said mechanical clutch means being simultaneously engageable to establish a reverse drive ratio between said input means and said output means.

2. A preselected multi-ratio power transmission comprising; input means for transmitting drive forces; output means; first, second and third friction clutch means each selectively engageable with said input means for accepting drive forces therefrom, first input gear means drivingly connected with said first friction clutch means; second input gear means drivingly connected with said second friction clutch means; third input gear means drivingly connected with said third clutch means; first output gear means drivingly connected with said first input gear means; second output gear means drivingly connected with said first and second input gear means; third output means drivingly connected between said third input gear means and said output means; and one double-acting synchronizer clutch for selectively engaging said first output gear means with said output means and alternately said second output gear means with said output means, said first friction clutch means and said one double-acting synchronizer clutch cooperating during engagement to establish two forward drive ratios between said input and output means, said second friction clutch means and said one double-acting synchronizer clutch cooperating during engagement to establish two other forward drive ratios between said input and output means, said third friction clutch means being engageable to provide another forward drive ratio between said input means and said output means; and said one double-acting synchronizer clutch being relieved of transmitting drive forces during the engagement of said third friction clutch means and being manipulable for alternate connection with either said first output gear or said second output gear while said third friction clutch means is engaged.

3. A preselected multi-ratio power transmission comprising; input means for transmitting drive forces; output means; first, second and third friction clutch means each selectively engageable with said input means for accepting drive forces therefrom, first input gear means drivingly connected with said first friction clutch means; second input gear means drivingly connected with said second friction clutch means; third input gear means drivingly connected with said third clutch means; first output gear means drivingly connected with said first input gear means; second output gear means drivingly connected with said first and second input gear means; third output means drivingly connected between said third input gear means and said output means: reverse gear means drivingly connected between said first input gear means and said third output gear means including a selectively engageable mechanical clutch means; and one double-acting synchronizer clutch for selectively engaging said first output gear means with said output means and alternately said second output gear means with said output means, said first friction clutch means and said one double-acting synchronizer clutch cooperating during engagement to establish two forward drive ratios between said input and output means, said second friction clutch means and said one double-acting synchronizer clutch cooperating during engagement to establish two other forward drive ratios between said input and output means, said third friction clutch means being engageable to provide a numerically central forward drive ratio between said input means and said output means, said first friction clutch means and said mechanical clutch means being simultaneously engageable to establish a reverse drive ratio between said input means and said output means, and said transmission ratio being interchanged from the first forward ratio to the second forward ratio by the interchange of said first and second friction clutches without manipulation of said one double-acting synchronizer clutch.

* * * * *